United States Patent
Ziemer

(10) Patent No.: US 7,429,230 B2
(45) Date of Patent: Sep. 30, 2008

(54) MULTI-STAGE AUTOMATIC TRANSMISSION

(75) Inventor: Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 338 days.

(21) Appl. No.: 10/552,597

(22) PCT Filed: Apr. 2, 2004

(86) PCT No.: PCT/EP2004/003487

§ 371 (c)(1),
(2), (4) Date: Jun. 13, 2006

(87) PCT Pub. No.: WO2004/090378

PCT Pub. Date: Oct. 21, 2004

(65) Prior Publication Data

US 2007/0111843 A1    May 17, 2007

(30) Foreign Application Priority Data

Apr. 7, 2003  (DE) ................................ 103 15 709

(51) Int. Cl.
*F16H 3/44* (2006.01)
(52) U.S. Cl. .................................................... 475/286
(58) Field of Classification Search ................ 475/271, 475/286
See application file for complete search history.

(56) References Cited

U.S. PATENT DOCUMENTS 4,395,925 A    8/1983    Gaus
6,425,841 B1   7/2002    Haka (Continued)

FOREIGN PATENT DOCUMENTS

DE    29 36 969 A1    4/1981

(Continued)

*Primary Examiner*—Dirk Wright
(74) *Attorney, Agent, or Firm*—Davis Bujold & Daniels, P.L.L.C.

(57) ABSTRACT

A multi-stage automatic transmission for a motor vehicle with standard drive has one overdrive front-mounted gearset (VS) which is connected with one input shaft (AN), a multi-member main gearset connected with one output shaft (AB) and connectable with one output element of the front-mounted gearset (VA), the same as six shifting elements (A, B, C, D, E, F) by the selective paired closing of which preferably eight forward gears can be engaged without range shifting. The main gearset comprises three rear-mounted gearsets (NS1, NS2, NS3) whose three sun gears (SO_NS1, SO_NS2, SO_NS3) are interconnected and can be connected with the output element of the front-mounted gearset (VS) and with the input shaft (AN). One web (ST_NS1) of the first rear-mounted gearset (NS1) is fixable and connectable with the input shaft (AN). One internal gear (HO_NS1) of the first rear-mounted gearset (NS1) and both webs (ST_NS2, ST_NS3) of the second and third rear-mounted gearsets (NS2, NS3) are interconnected and connected with the input shaft (AB). One internal gear (HO_NS2) of the second rear-mounted gearset (NS2) is fixable. One internal gear (HO_NS3) of the third rear-mounted gearset (NS3) can be connected with the output element of the front-mounted gearset (VS). One connecting element (VE) from the output element of the main gearset to the output shaft (AB) is axially tied between the second and third rear-mounted gearset (NS2, NS3) on the coupled web (ST_NS2, ST_NS3) thereof and overlaps the third rear-mounted gearset (NS3) radially when viewed in axial direction.

23 Claims, 5 Drawing Sheets

U.S. PATENT DOCUMENTS

| | | | |
|---|---|---|---|
| 6,558,287 B2 * | 5/2003 | Hayabuchi et al. | 475/271 |
| 6,752,737 B2 * | 6/2004 | Ishimaru et al. | 475/275 |
| 6,884,197 B2 * | 4/2005 | Ishimaru et al. | 475/271 |
| 7,101,305 B2 * | 9/2006 | Tabata et al. | 475/296 |
| 2002/0086765 A1 | 7/2002 | Takagi et al. | |

FOREIGN PATENT DOCUMENTS

| | | |
|---|---|---|
| DE | 102 13 820 A1 | 10/2002 |
| EP | 1 371 877 A2 | 12/2003 |
| JP | 2002-213545 | 7/2002 |
| WO | WO-02/099315 A1 | 12/2002 |

* cited by examiner

Closed Shifting element

| Speed | \multicolumn{6}{c}{Shifting element} | Gear ratio | Step |
|---|---|---|---|---|---|---|---|---|
| | A | B | C | D | E | F | | |
| 1 |   |   | ● |   |   | ● | 4.00 | 1.60 |
| 2 |   | ● |   |   |   | ● | 2.50 | 1.44 |
| 3 |   |   |   |   | ● | ● | 1.73 | 1.39 |
| 4 |   | ● |   |   | ● |   | 1.24 | 1.24 |
| 5 |   |   | ● |   | ● |   | 1.00 | 1.20 |
| 6 | ● |   |   |   | ● |   | 0.83 | 1.17 |
| 7 | ● |   | ● |   |   |   | 0.71 | 1.14 |
| 8 | ● | ● |   |   |   |   | 0.62 | |
| R |   |   | ● | ● |   |   | −3.11 | Total 6.41 |

Fig. 4

MULTI-STAGE AUTOMATIC TRANSMISSION

This application is a national stage completion of PCT/EP2004/003487 filed Apr. 2, 2004 which claims priority from German Application Serial No. 103 15 709.3 filed Apr. 7, 2003.

1. Field of the Invention

The invention concerns a multi-stage automatic transmission for a motor vehicle.

2. Background of the Invention

DE 102 13 820 A1 has disclosed several planet gearset arrangements for a converter automatic transmission having eight forward gears shiftable without range shifting and one reverse gear, each having one overdrive front-mounted gearset designed as single planet gearset, one main gear designed as two-web four-shaft transmission, the same as six shifting elements (four clutches, two brakes). The main gearset is either designed as Ravigneaux gearset or has two single planet gear sets coupled with each other. In FIG. 1 is shown as prior art, one of the alternative arrangements of DE 102 13 820 A1 where the main gearset is designed as "Simpson gearset". Such a planet gearset design is known to be comparatively favorable with regard to gearset load (idle power) and planetary gear rotational speeds and thus with regard to efficiency. As can be seen in FIG. 1, the front-mounted planet gearset VS has one sun gear SO_VS, one internal gear HO_VS and one web ST_VS with planetary gears P_VS. The main gearset is formed by one first and one second single planet gear sets NS1, NS2, each having one sun gear SO_NS1, SO_NS2, one internal gear HO_NS1, HO_NS2 and one web ST_NS1, ST_NS2 with planetary gears P_NS1, P_NS2. The sun gear SO_VS of the front-mounted gearset VS is fixed on a transmission housing GE. The web ST_VS is firmly connected as input element of the front-gearset VS with one input shaft AN of the transmission. The internal gear HO_VS forms the output element of the front-mounted gearset VS. The numeric designation of the four shafts of the main gearset designed as two-web four-shaft transmission is oriented to the sequence in the rotational speed plan of the gearset diagram. The fixedly interconnected sun gears SO_NS1, SO_NS2 of the planet gear sets NS1, NS2 form the first shaft of the main gearset and can be connected via the shifting element B with the internal gear HO_VS of the front-mounted gearset VS and via the shifting element C with the input shaft AN. The web ST_NS1 of the planet gearset NS1 forms the second shaft of the main gearset and can be fixed via the shifting element D on the transmission housing GE and via the shifting element E can be connected with the input shaft AN. Web ST_NS2 of the gearset NS2 and internal gear HO_NS1 of the gearset NS1 are firmly interconnected, form the third shaft of the main gearset and as output element of the main gearset are connected with an output shaft AB of the automatic transmission. The internal gear HO_NS2 of the planet gearset NS2 forms the fourth shaft of the main gearset designed as two-web four-shaft transmission and can be connected via the shifting element A with the internal gear HO_VS of the front-mounted gearset VS and can be fixed via the shifting element F on the transmission housing GE. According to this tying, the coupled sun gears SO_NS1, SO_NS2 can also be connected with the internal gear HO_NS2 specifically via simultaneous shifting of the shifting elements A and B. According to this tying the coupled sun gears SO_NS1, SO_NS2 can also be connected with the web ST_NS1 and this via simultaneous shifting of the shifting elements C and E.

In conformity with the tying described on the individual planet gearset elements with each other and with the six shifting elements, this planet gearset diagram of DE 102 13 820 A1 is adequate only for use with non-coaxial arrangement of the input and output shafts AN, AB, that is, such as for a motor vehicle having a prime mover situated across the direction of travel ("front-transverse drive").

Based on the prior art described, the problem on which this invention is based is to provide a transmission diagram for a multi-stage automatic transmission for a motor vehicle with standard drive, that is, with input and output shafts disposed coaxially with each other, six shifting elements by the selective paired closing of which a transmission input rotational speed of the input shaft can be transmitted without range shifting to the output shaft, one main gearset permanently connected with the output shaft via a main gearset element and connectable with one output element of the front-mounted planet gearset, and similar advantages of a Simpson planet gearset. At the same time the automatic transmission must preferably have eight forward gears and great total spreading.

SUMMARY OF THE INVENTION

Departing from the cited prior art, the inventive multi-stage automatic transmission has one input shaft and one output shaft but now disposed coaxially with each other, the same as six shifting elements (four clutches and two brakes) by the selective closing of which a transmission input rotational speed of the input shaft can be transmitted to the output shaft so that to change from one gear to the next following higher or to the next following lower gear, of the shifting elements precisely actuated only one shifting element is opened and one other shifting element closed.

In addition, the inventive multi-stage automatic transmission has one single overdrive planet gearset as front-mounted planet gearset and one multi-member planet gear as main gearset. One element (sun gear) of the front-mounted planet gearset is fixedly connected with one housing of the automatic transmission. One input element (web) of the front-mounted planet gearset is fixedly connected with the input shaft. One output element (internal gear) of the front-mounted planet gearset can be connected via the first and second shifting elements with at least two different elements (coupled sun gears, one internal gear) of the main gearset. At least two elements (coupled sun gears, one web) of the main gearset can be connected via the third and fifth shifting elements with the input shaft of the automatic transmission, one of said elements (web) being fixable on the transmission housing also via the fourth shifting element. One other element (internal gear) of the main gearset can be exclusively fixed via the sixth shifting element on the transmission housing. Still one other element (one web coupled with one internal gear) of the main gearset finally forms the output element of the main gearset and is exclusively firmly connected with the output shaft of the automatic transmission.

Like in the above described prior art of DE 102 13 820 A1, the main gearset is configured similarly to a Simpson planet gearset with the same known advantages relative to load of the parts, planetary gear rotational speeds and in particular efficiency. Unlike DE 102 13 820 A1, the main gearset of the multi-stage automatic transmission is not designed as two-web four-shaft transmission, but inventively as coupled, reduced three-web five-shaft transmission. The reduction of the main gearset comprised in principle of three rear-mounted planet gear sets consists in that the sun gears, the planetary gears and the webs of the second and third rear-mounted planet gear sets are respectively interconnected or combined.

Compared to the prior art of DE 102 13 820 A1, the constructional additional expenditure is thus limited to one other central gear.

The first rear-mounted planet gearset of the inventively reduced three-web five-shaft main gearset corresponds in function and tying to the first planet gearset of the two-web four-shaft Simpson main gearset described in DE 102 13 820 A1. The second planet gearset of the two-web four-shaft Simpson main gearset described in DE 02 13 820 A1 is not replaced by a combination of two rear-mounted planet gearsets, this combination—viewed as one whole—being connected with the other transmission components in the same manner as the second planet gearset of a previously mentioned two-web four-shaft Simpson main gearset. In a first inventive solution, this combination is formed by two separate single planet gearsets each having one internal gear; the main gearset then accordingly having three separate rear-mounted planet gearsets. In a second inventive solution this combination is formed by a coupled rear-mounted planet gearset with one sun gear and two internal gears.

By using a three-web five-shaft main gearset with three non-coupled internal gears instead of the two-web four-shaft Simpson main gearset with only two non-coupled internal gears known from the prior art, it is now possible spatially to separate the tying on the side of the sixth shifting element (brake for fixing on the transmission housing) and on the first shifting element (clutch for connection to the output element of the front-mounted planet gearset). It is, in turn, possible hereby to construct the connecting element between the output element of the main gearset and the output shaft of the automatic transmission so that input and output shafts of the automatic transmission can be disposed coaxially with each other, the automatic transmission being thus suited for installing in a motor vehicle with standard drive. According to the invention, said connecting element, spatially viewed, penetrates between the two internal gears of the second and third rear-mounted planet gearsets or of the coupled rear-mounted gearset and, viewed in axial direction, overlaps radially entirely the internal gear of the third gear-mounted planet gearset or the second internal gear of the coupled rear-mounted gearset.

BRIEF DESCRIPTION OF THE DRAWINGS

The inventive coupling of the individual elements of the planet gearsets to each other and to the six shifting elements, the same as the tying thereof on input and output shafts of the multi-stage transmission, is now described in detail with the aid of the following Figures. Similar structural elements are provided with the same references. The Figures show:

FIG. 4 is a shifting logic of the inventive multi-stage automatic transmission according to FIG. 2 and FIG. 3.

DETAILED DESCRIPTION OF THE INVENTION

Figure 1:
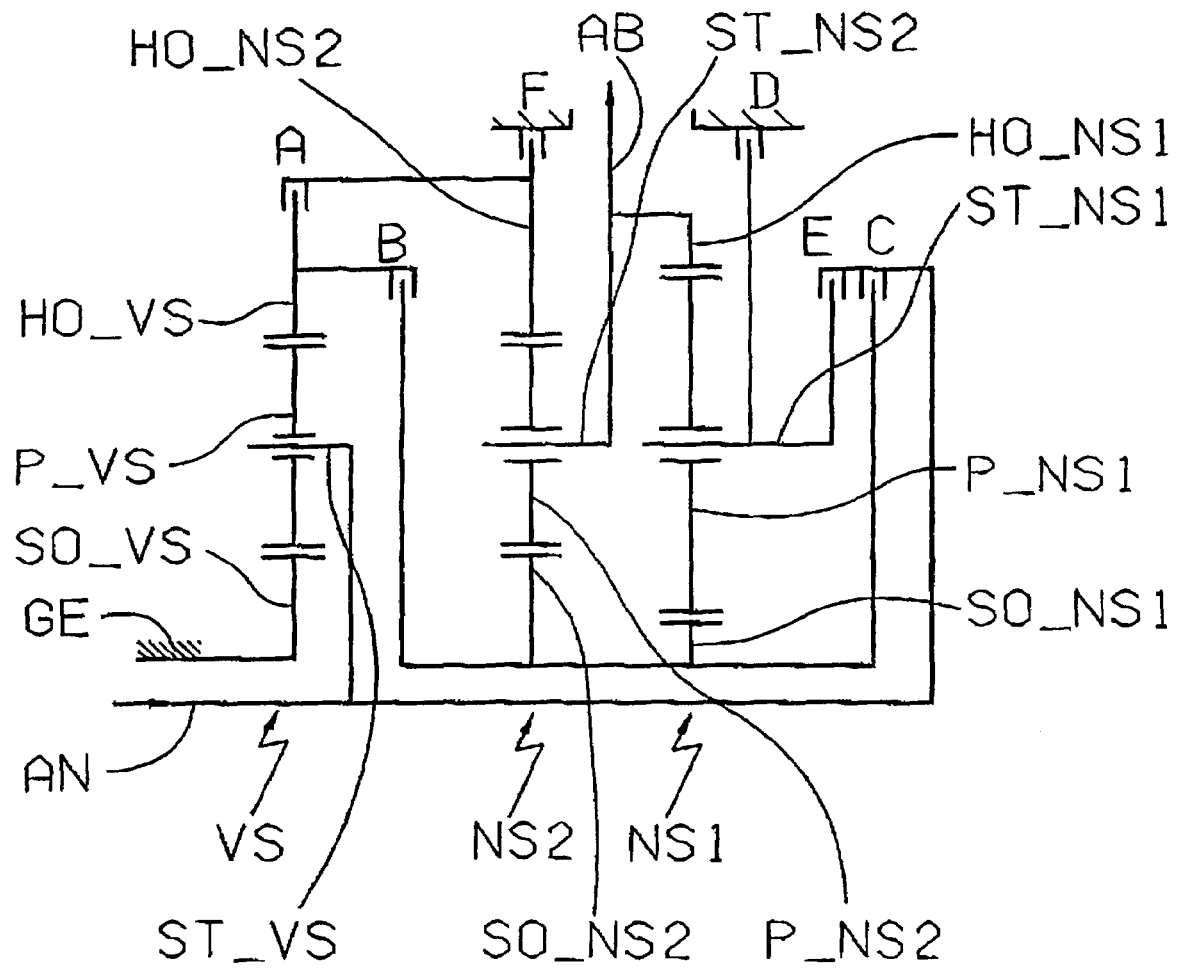
FIG. 1 is a transmission diagram of an 8-gear automatic transmission according to the prior art for front-transverse drive.

The transmission diagram according to the prior art of DE 102 13 820 A1 shown in FIG. 1 has already been described in detail.

Figure 2:
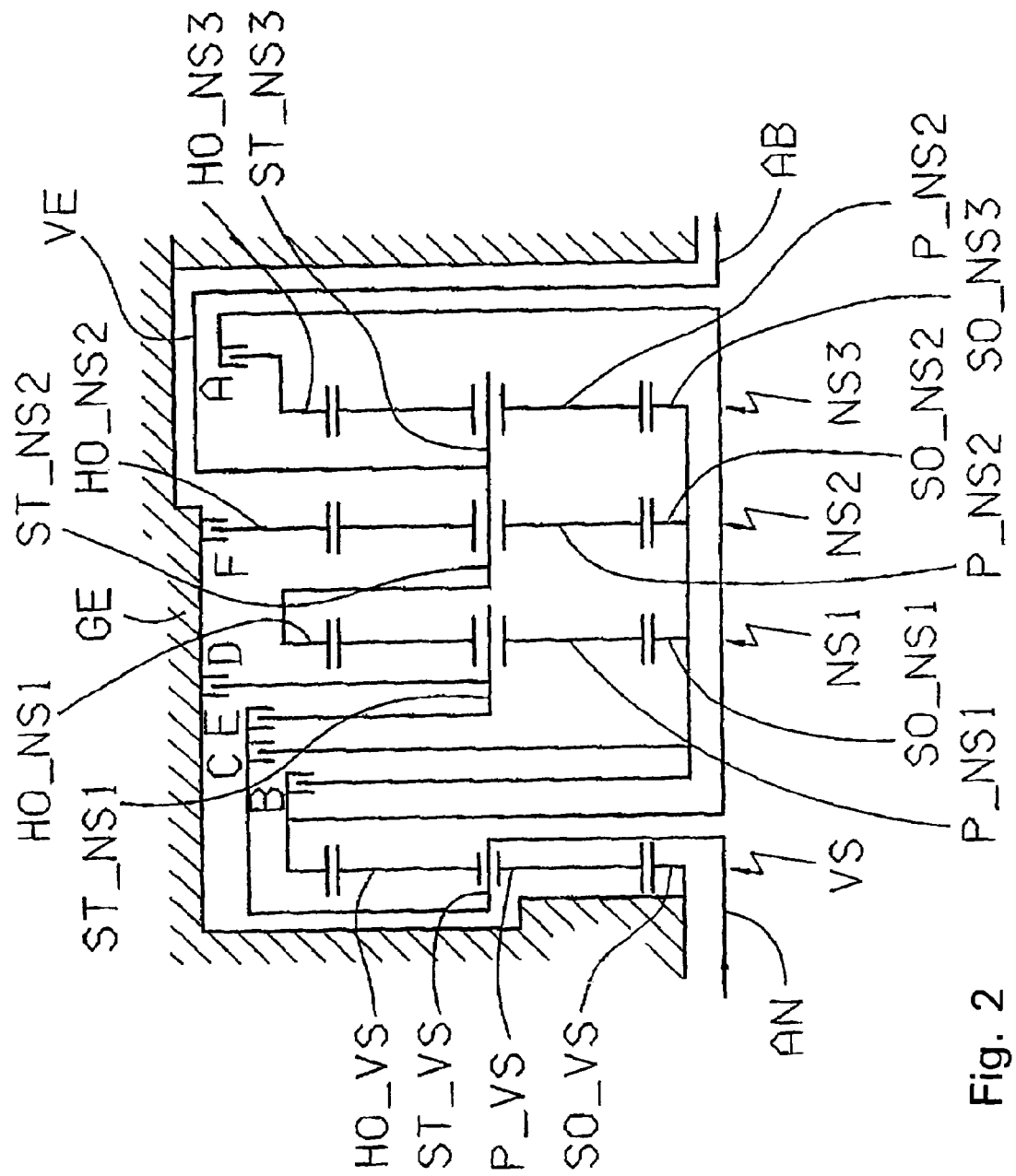
FIG. 2 is a first embodiment for a transmission diagram of an inventive multi-stage automatic transmission for standard drive.

FIG. 2 shows now a first embodiment for a transmission diagram of an inventive multi-stage automatic transmission for standard drive. Like in FIG. 1 with AN is designated the input shaft of the automatic transmission, with AB the output shaft of the automatic transmission, with GE the housing of the transmission and with A to F the individual six shifting elements. The multi-stage automatic transmission has altogether four separate planet gearsets all disposed coaxially with each other, one front-mounted gearset VS designed as overdrive planet gearset and three rear-mounted gearsets NS1, NS2, NS3. The sun gear SO_VS of the front-mounted gearset VS is fixed on the transmission housing GE. The web ST_VS forms the input element of the front-mounted gearset VS and is firmly connected with the input shaft AN. The internal gear HO_VS forms the output element of the front-mounted gearset VS connectable with individual elements of the main gearset.

The main gearset formed by three rear-mounted gearsets NS1, NS2, NS3 is designed as three-web drive-shaft transmission. The numeric designation used herebelow of the five shafts of the main gearset is oriented to a sequence on a rotational speed plan of the gearset diagram. The first main gearset shaft is formed by the three firmly interconnected sun gears SO_NS1, SO_NS2, SO_NS3 of the three rear-mounted gearsets NS1, NS2, NS3 and can be connected via the second shifting element B with the internal gear HO_VS of the front-mounted gearset VS and via the third shifting element C with the input shaft AN. The web ST_NS1 of the rear-mounted gearset NS1 forms the second main gearset shaft and via the shifting element D can be fixed on the transmission housing GE and via the shifting element E can be connected with the input shaft AN. Internal gear HO_NS1 of the rear-mounted gearset NS1, web ST_NS2 of the rear-mounted gearset NS2 and web ST_NS3 of the rear-mounted gearset NS3 are firmly interconnected as third main gearset shaft and as output element of the main gearset are connected with the output shaft AB of the automatic transmission. The internal gear HO_NS2 of the rear-mounted gearset NS2 forms the fourth main gearset shaft and via the shifting element F can be fixed on the transmission housing GE. The internal gear HO_NS3 finally forms the fifth main gearset shaft and via the shifting element A can be connected with the internal gear HO_VS of the front-mounted gearset VS. According to this tying of the parts, the coupled sun gears SO_NS1, SO_NS2, SO_NS3 of the main gearset can also be connected with the internal gear HO_NS3 of the third rear-mounted gearset, specifically via a simultaneous shifting of the shifting elements A and B. According to this tying the coupled sun gears SO_NS1, SO_NS2, SO_NS3 of the main gearset can also be connected with the web ST_NS1 of the first rear-mounted gearset, specifically via simultaneous shifting of the shifting elements C and E.

In this arrangement shown as first embodiment in FIG. 2, the three rear-mounted gearsets NS1, NS2, NS3 are axially disposed side-by-side in a row. The first rear-mounted gearset NS1 within the transmission housing GE here faces the front-mounted gearset and the third rear-mounted gearset NS3 is upon the side of the automatic transmission opposite the front-mounted gearset VS. The front-mounted gearset VS is here located upon the side of the automatic transmission which faces a prime mover of the automatic transmission (not shown in FIG. 2 for simplification). Accordingly, the third rear-mounted gearset NS3 is situated upon the side of the automatic transmission opposite the prime mover.

In the first embodiment, the front-mounted gearset VS abuts directly on the side of the transmission housing GE which faces the prime mover (not shown). The clutch B is situated upon the side of the front-mounted gearset VS remote from the prime mover, that is, upon the side thereof facing the first rear-mounted gearset NS1. The clutch B, specially one servo device of the clutch B (not plotted) so as to simplify the graph in FIG. 2, is situated, spatially seen, that is, axially between the front-mounted gearset VS and the first rear-mounted gearset NS1. In another development particularly the discs of the clutch B, viewed in axial direction, can also be situated at least in part radially above the front-mounted gearset VS. In still another development, specially the discs of the clutch B can also be situated at least in part upon the side of the front-mounted gearset VS remote from the first rear-mounted gearset NS1, one output element of the clutch B then radially overlapping in axial direction the internal gear HO_VS of the front-mounted gearset VS.

Spatially viewed the clutch E is situated closer to the first rear-mounted gearset NS1 then the clutch C, the discs of the clutch E in particular being situated closer to the first rear-mounted gearset NS1 than the discs of the clutch C> In the embodiment shown in FIG. 2 both the discs of the clutch C and the discs of the clutch E are disposed on at least similar diameters, viewed in axial direction, between the discs of the clutch B and the first rear-mounted gearset NS1. In another development, to spare axial transmission length, the discs of the clutch C, viewed also in axial direction, can be at least in part situated radially above the discs of the clutch B. In still another length-sparing development, the discs of the clutch C, also viewed in axial direction, can be situated at least in part radially above the front-mounted gearset VS and the discs of the clutch E, viewed in axial direction, at least in part radially above the discs of the clutch B.

In the embodiment shown in FIG. 2, the clutch A abuts directly on the third rear-mounted gearset NS3 upon the side thereof remote from the second rear-mounted gearset NS2. The clutch A is, therefore, located directly on the side of the transmission housing GE close to the transmission output. The connecting element VE overlapping the third rear-mounted gearset NS3, viewed in axial direction, also entirely overlaps here the clutch A. One servo device (for simplification not shown in FIG. 2) of the clutch A is conveniently situated axially between the third rear-mounted gearset NS3 and one at least predominantly perpendicular section of an input element of the clutch A (one cup-shaped outer disc carrier in the embodiment), axially abutting directly on the third rear-mounted gearset NS1.

The discs of the brake D are conveniently located in the area close to the internal gear HO_NS1 of the first rear-mounted gearset NS1 and the discs of the brake F in the area of the internal gear HO_NS2 of the second rear-mounted gearset NS2.

For nesting the parts within the transmission housing GE, the arrangement of the individual shifting elements relative to the individual planet gearsets, described with reference to FIG. 2, is very favorable. The nesting is made possible by direct connection of the combined input element of the clutches C, E firmly connected with the input shaft AN axially through the web ST_VS of the front-mounted gearset VS. The input element of the clutches C, E is preferably designed as output disc carrier having a first section of radial extension situated spatially upon the side of the front-mounted gearset VS facing the main gearset and firmly connected with the input shaft AN, a second section of axial extension which joins the first section and penetrates in axial direction the web ST_VS, a third section of radial extension which joins the second section and is situated on the side of the front-mounted gearset VS opposite the main gearset and extends outwardly in radial direction up to a diameter above the front-mounted gearset VS, the same as a fourth section of axial extension which joins the third section and in axial direction extends radially above the front-mounted gearset VS up to a spline section for discs of the clutch C and clutch E and, at the same time, axially entirely overlaps the front-mounted gearset VS.

Figure 3:
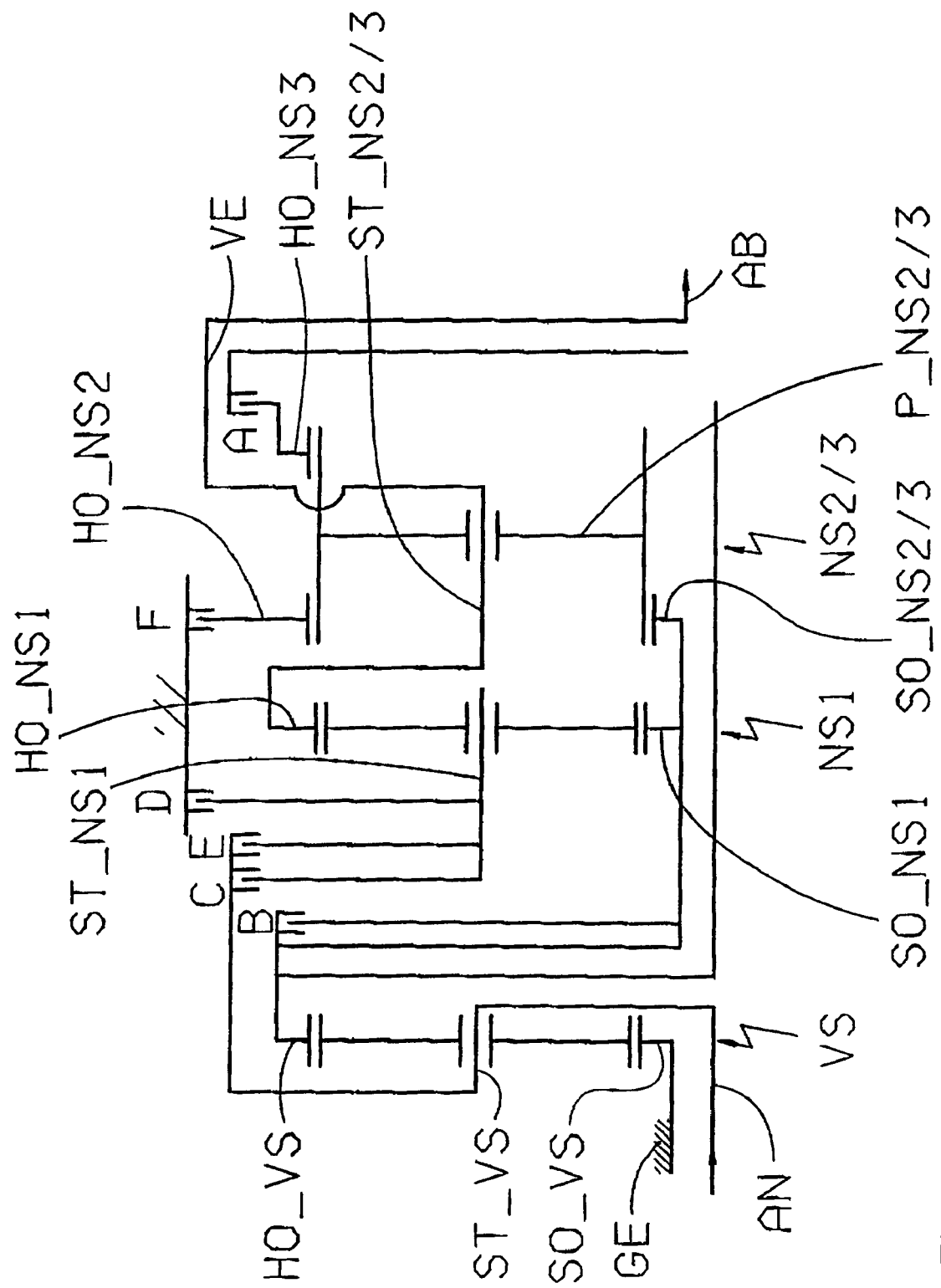
FIG. 3 is a second embodiment for a transmission diagram of an inventive multi-stage automatic transmission for standard drive.

FIG. 3 now shows a second embodiment for a transmission diagram of an inventive multi-stage automatic transmission based on the first embodiment explained in detail above with reference to FIG. 2. Unlike in the first inventive embodiment, the second and third rear-mounted gearsets are now combined to form a coupled rear-mounted gearset NS3 having a common sun gear SO_NS23, a common web ST_NS23 on which are supported the planetary gears P_NS23 of common length that mesh with the sun gear SO_NS23, and two separate internal gears HO_NS2 and HO_NS3 both of which mesh with the long planetary gears P_NS23. Like FIG. 2, the internal gear HO_NS2 is connected with an input element (preferably an inner disc carrier) of the brake F and the internal gear HO_NS3 with one output element (preferably an inner disc carrier) of the clutch A. The sun gear SO_NS23 is connected with the sun gear SO_NS1 of the first rear-mounted gearset NS1. The web ST_NS23 is simultaneously connected with the internal gear HO_NS1 of the first rear-mounted gearset NS1 and the output shaft AB, the connecting element VE being now tied on the side of the coupled rear-mounted gearset NS23 remote from the first rear-mounted gearset NS23 to the web ST_NS23, viewed in axial direction, radially penetrating between the two internal gears HO_NS2 and HO_NS3 and entirely overlapping the clutch A.

Figure 5:
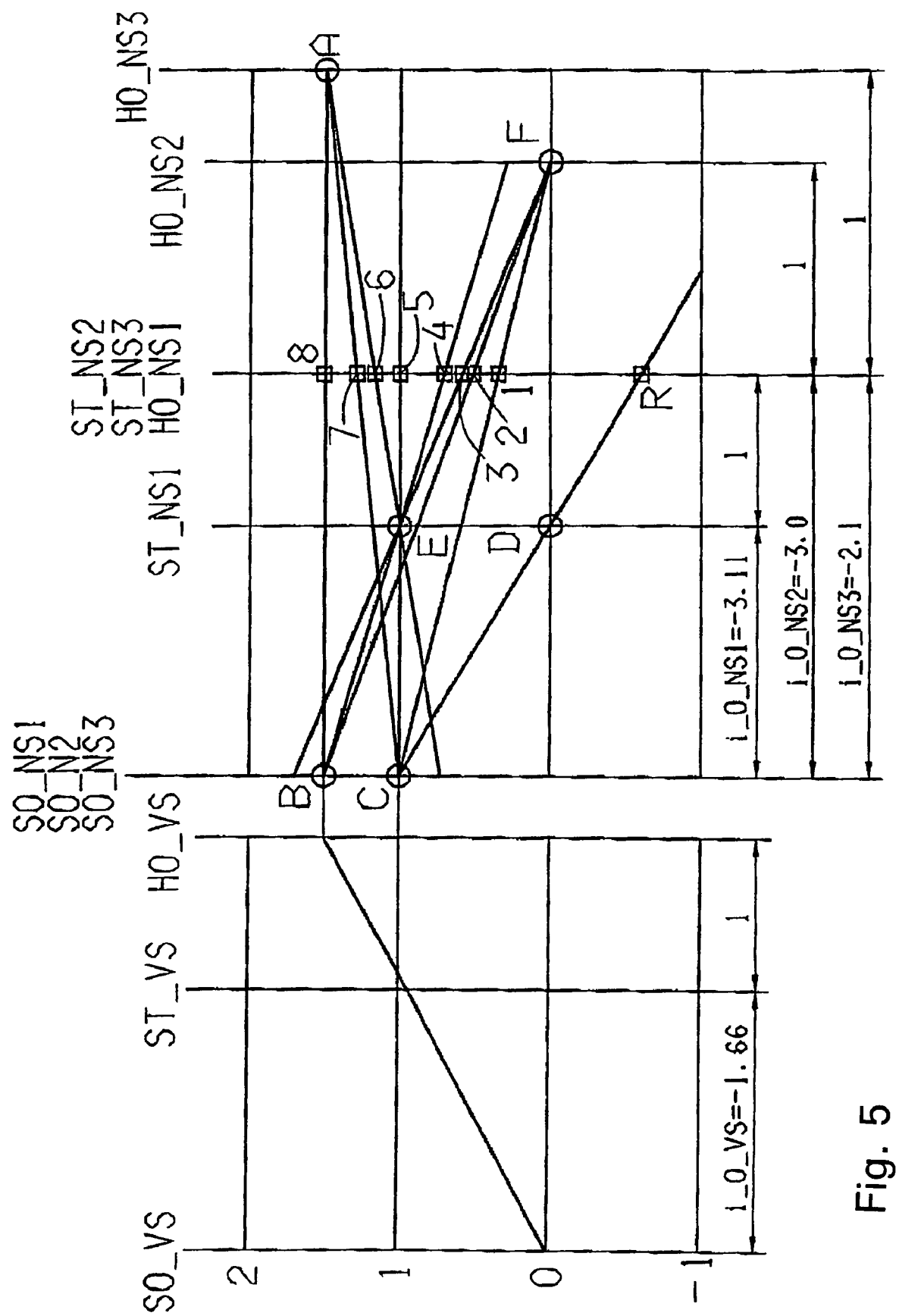
FIG. 5 is a rotational speed plan of the inventive multi-stage automatic transmission according to FIG. 2 and FIG. 3.

FIG. 4 shows a shifting logic of the embodiments of an inventive multi-stage automatic transmission shown in FIG. 2 and FIG. 3 with the corresponding ratios and ratio steps. FIG. 5 shows the appertaining rotational speed plan. The reference numerals of the individual gearset shafts plotted in the rotational speed plan correspond to the reference numerals used in the contents of the description of FIG. 2. Additionally plotted are the ratios of the individual gearsets, namely i_0_VS for the front-mounted gearset VS, i_0_NS1 for the first rear-mounted gearset NS1, i_0_NS2 for the second rear-mounted gearset NS2 and i_0_NS3 for the third gear-mounted gearset NS3.

By selective paired closing of two of the total of six shifting elements via the shifting logic shown in FIG. 4, eight forward gears can be shifted each without range shifting. Therefore, when changing from one gear to the next following higher or to the next following lower gear, of the precisely actuated shifting elements, each time only one shifting element is opened and one other shifting element, not previously actuated, is closed.

In the first forward gear, the clutch C and the brake F are closed, that is, the fourth main gearset shaft (internal gear HO_NS2) stands still and the first main gearset shaft (sun gears SO_NS1, SO_NS2, SO_NS3 and SO_NS1, SO_NS23) is connected with the input shaft AN. In the second forward gear clutch B and brake F are closed, that is, the fourth main gear shaft (internal gear HO_NS2) stands still without change and the first main gear shaft (sun gears SO_NS1, SO_NS2, SO_NS3 and SO_NS1, SO_NS23) is now connected with the output element (internal gear HO_VS) of the front-mounted gearset VS. In the third forward gear clutch E and brake F are closed, that is, the fourth main gear shaft (internal gear HO_NS2) stands still without change and the second main gearset shaft (web ST_NS1) is now connected with the input shaft AN. In the fourth forward gear the clutches B and E are closed, that is, the first main gearset shaft (sun gears SO_NS1, SO_NS2, SO_NS3 and SO_NS1 and SL_NS23) is connected with the output element (internal gear (HO_VS) of the front-mounted gearset VS and the second main gearset shaft (web ST_NS1) with the input shaft AN. In the fifth forward gear the clutches C and E are closed, that is, the first main gearshaft (sun gears SO_NS1, SO_NS2, SO_NS3 and SO_NS1, SO_NS23) is now simultaneously connected with the input shaft AN and the second main gearset shaft (web ST_NS1). In the sixth forward gear the clutches A and E are closed, that is, the fifth main gearset shaft (internal gear HO_NS3) is connected with the output element (internal gear HO_VS) of the front-mounted gearset VS and the second main gearset shaft (web ST_NS1) with the input shaft AN. In the seventh forward gear the clutches A and C are closed, that is, the fifth main gearset shaft (internal gear HO_NS)—like in the sixth gear—is connected with the output element (internal gear HO_VS) of the front-mounted gearset VS and the first gearset shaft (sun gears SO_NS1, SO_NS2 and SO_NS3 and SO_NS1 and SO_NS23) is now connected with the input shaft AN. Finally, in the eighth forward gear the clutches A and B are closed, that is, the fifth main gearset shaft (internal gear HO_NS3) is now simultaneously connected with the first main gearset shaft (sun gears SO_NS1, SO_NS2 and SO_NS3 and SO_NS1 and SO_NS23) and the output element (internal gear HO_VS) of the front-mounted gearset VS.

As can further be seen in FIG. 4, clutch C and brake D are closed in a reverse gear and thus the first main gearset shaft (sun gears SO_NS1, SO_NS2 and SO_NS3 and SO_NS1 and SO_NS23) is connected with the input shaft AN and the second main gearset shaft (web ST_NS1) is fixed on the transmission housing GE.

The third shifting element (clutch C) can advantageously be used as start-off element integrated in the automatic transmission with which the motor vehicle can be started both in forward and in reverse travel direction without a reversal of rotation occurring in the friction elements of the shifting element when reversing the motor vehicle.

If desired, to start off also in the second and/or third forward gear via the same shifting element inside the transmission at the moment, the sixth shifting element (brake F) can be provided as starting element. In this case, the start off in reverse gear takes place via one other shifting element inside the transmission either via the third shifting element (clutch C) or via the fourth shifting element (brake D). The electro-hydraulic control of both starting elements for comfortably reversing the motor vehicle is accordingly more expensive than in the above described case with one starting element for both directions of travel.

However, the inventive multi-stage transmission can obviously be combined with a separate starting element such as a rotational speed converter or a separate starting clutch supported before the multi-stage transmission.

In the first embodiment sown in FIG. 2 of an inventive multi-stage transmission, the ratio of the third rear-mounted gearset NS3 is quantitatively lower than, equals to or higher than the ratio of the second rear-mounted gearset NS2. In the rotational speed plan in FIG. 5 by way of example is plotted a ratio of the third rear-mounted gearset NS3 which is quantitatively lower than the ratio of the second rear-mounted gearset NS2. The fifth shaft in the rotational speed plan is accordingly plotted "to the right" of the fourth shaft. By virtue of this possibility of selecting independently of each other the ratios of the second and third rear-mounted gearsets NS2, NS3, one other design clearance results for the gear gradation.

An analogous possibility for the second embodiment of an inventive multi-stage automatic transmission described with reference to FIG. 3 is offered by the fact that the planetary gears P_NS23 of the coupled rear-mounted gearset NS23 have been designed as stepped planets. Regardless of whether the first step of the stepped planetary gears P_NS23 is geometrically larger than the second step or viceversa, the sun gear SO_NS3 meshes with one of the two steps, the internal gear HO_NS2 with the first step and the internal gear HO_NS3 with the second step of the stepped planetary gears P_SN23.

REFERENCE NUMERALS

A first shifting element (clutch)
B second shifting element (clutch)
C third shifting element (clutch)
D fourth shifting element (brake)
E fifth shifting element (brake)
F sixth shifting element (Brake)
AN input shaft
AB output shaft
GE transmission housing
VE connecting element
VS front-mounted gearset
SO_VS sun gear of front-mounted gearset
HO_VS internal gear of front-mounted gearset
ST_VS web of front-mounted gearset
P_VS planetary gears of front-mounted gearset
NS1 first rear-mounted gearset
SO_NS1 sun gear of first rear-mounted gearset
HO_NS1 internal gear of first rear-mounted gearset
ST_NS1 web of first rear-mounted gearset
P_NS1 planetary gears of first rear-mounted gearset
NS2 second rear-mounted gearset
SO_NS2 sun gear of second rear-mounted gearset
HO_NS2 internal gear of second rear-mounted gearset
ST_NS2 web of second rear-mounted gearset
P_NS2 planetary gears of second rear-mounted gearset
NS3 third rear-mounted gearset
SO_NS3 sun gear of third rear-mounted gearset
HO_NS3 internal gear of third rear-mounted gearset
ST_NS3 web of third rear-mounted gearset
P_NS3 planetary gears of third rear-mounted gearset
NS23 coupled rear-mounted gearset
SO_NS23 sun gear of coupled rear-mounted gearset
ST_NS23 web of coupled rear-mounted gearset
P_NS23 planetary gears of coupled rear-mounted gearset
i_0_VS transmission ratio of front-mounted gearset
i_0_NS1 transmission ratio of first rear-mounted gearset
_O_NS2 ratio of second rear-mounted gearset
i_O_NS4 ratio of third rear-mounted gearset

The invention claimed is:

1. A multi-stage automatic transmission having a front-mounted gearset (VS) as an overdrive planet gearset, a main gearset designed as a multi-member planetary gear and first, second, third, fourth, fifth and sixth shifting elements (A, B, C, D, E, F) which, by selective engagement thereof, a transmission input rotational speed of an input shaft (AN) of the multi-stage automatic transmission can be transmitted to an output shaft (AB) of the multi-stage automatic transmission whereby when changing from one gear to a next following higher or a next following lower gear, of actuated shifting elements, only one additional shifting element is engaged and one of the engaged shifting elements is disengaged;

a sun gear (SO_VS) of the front-mounted gearset (VS) is fixed to a transmission housing (GE) of the multi-stage automatic transmission;

a web (ST_VS) of the front-mounted gearset (VS) is connected with the input shaft (AN) of the multi-stage automatic transmission;

the main gearset has a first, a second and a third rear-mounted gearset (NS1, NS2, NS3);

a sun gear (SO_NS1) of the first rear-mounted gearset (NS1) and a sun gear (SO_NS2) of the second rear-mounted gearset (NS2) are interconnected and can be connected, via a second shifting element (B), with an internal gear (HO_VS) of the front-mounted gearset (VS) and, via a third shifting element (C), with the input shaft (AN);

a web (ST_NS1) of the first rear-mounted gearset (NS1) can be fixed, via a fourth shifting element (D), to the transmission housing (GE) and, via a fifth shifting element (E), can be connected with the input shaft (AN);

an internal gear (HO_NS1) of the first front-mounted gearset (NS1) and a web (ST_NS2) of the second rear-mounted gearset (NS2) are interconnected and connected with the output shaft (AB);

an internal gear (HO_NS2) of the second rear-mounted gearset (NS2) can be fixed, via a sixth shifting element (F), to the transmission housing (GE);

a sun gear (SO_NS3) of the third rear-mounted gearset (NS3) is coupled with the sun gear (SO_NS2) of the second rear-mounted gearset (NS2);

a web (ST_NS3) of the third rear-mounted gearset (NS3) is coupled with the web (ST_NS2) of the second rear-mounted gearset (NS2);

an internal gear (HO_NS3) of the third rear-mounted gearset (NS3) can be connected, via a first shifting element (A), with the internal gear (HO_VS) of the front-mounted gearset (VS);

a connecting shifting element (VE) is provided, for connecting the output shaft (AB) and the coupled webs (ST_NS2, ST_NS3) of the second and third rear-mounted gearsets (NS2, NS3), which, when spatially viewed, penetrates axially between the internal gears (HO_NS2, HO_NS3) of the second and third rear-mounted gearsets (NS2, NS3) and, when viewed in an axial direction, entirely overlaps radially the internal gear (HO_NS3) of the third rear-mounted gearset (NS3); and the input shaft (AN) and the output shaft (AB) are disposed coaxially with respect to one another.

2. The multi-stage automatic transmission according to claim 1 wherein the third rear-mounted gearset (NS3) is disposed adjacent to the second rear-mounted gearset (NS2).

3. The multi-stage automatic transmission according to claim 1, wherein the second and third rear-mounted gearsets (NS2, NS3) are combined to form a coupled rear-mounted gearset (NS23) having two internal gears (HO_NS2, HO_NS3), a common sun gear (SO_NS23) and a common web (ST_NS23) with common planetary gears (P_NS23).

4. The multi-stage automatic transmission according to claim 1, wherein a ratio (i-O_NS3) of the third rear-mounted gearset (NS3) has quantitatively the same size as a ratio (i_0_NS2) of the second rear-mounted gearset (NS2).

5. The multi-stage automatic transmission according to claim 1, wherein a ratio (i_0_NS3) of the third rear-mounted gearset (NS3) is one of quantitatively lower or higher than a ratio (i_0_NS2) of the second rear-mounted gearset (NS2).

6. A multi-stage automatic transmission having one front-mounted gearset (VS) designed as an overdrive planet gearset, one main gearset designed as a multi-member planetary gear, first, second, third, fourth, fifth and sixth shifting elements (A, B, C, D, E, F) which, by selective engaging thereof, a transmission rotational speed of one input shaft (AN) of the multi-stage automatic transmission can be transmitted to an output shaft (AB) of the multi-stage automatic transmission so that when changing from one gear to a next following higher or a next following lower gear, of actuated shifting elements, only one additional shifting element is engaged and one of the engaged shifting elements is disengaged;

a sun gear (SO_VS) of the front-mounted gearset (VS) is fixed to a transmission housing (GE) of the multi-stage automatic transmission;

a web (ST_VS) of the front-mounted gearset (VS) is connected with the input shaft (AN) of the multi-stage automatic transmission;

the main gearset has a first rear-mounted gearset (NS1);

a sun gear (SO_NS1) of the first rear-mounted gearset (NS1) can be connected, via a second shifting element (B), with an internal gear (HO_VS) of the front-mounted gearset (VS) and, via a third shifting element (C), with the input shaft (AN);

a web (ST_NS1) of the first rear-mounted gearset (NS1) can be fixed, via a fourth shifting element (D), to the transmission housing (GE) and can be connected, via a fifth shifting element (E), with the input shaft (AN);

an internal gear (HO_NS1) of the first rear-mounted gearset (NS1) is connected with the output shaft (AB);

the main gearset has a second rear-mounted gearset, a coupled rear-mounted gearset (NS23) with second and third internal gears (HO_NS2, HO_NS3), a sun gear (SO_NS23) and a web (ST_NS23);

the planetary gears (P_NS23), supported on the web (ST_NS23) of the coupled rear-mounted gearset (NS23), mesh with the sun gear (SO_NS23) and both of the internal gears (HO_NS2, HO_NS3) of the coupled rear-mounted gearset (NS23);

the first internal gear (HO_NS2) of the coupled rear-mounted gearset (NS23) can be fixed, via a sixth shifting element (F), to the transmission housing (GE);

the second internal gear (HO_NS3) of the coupled rear-mounted set (NS23) can be connected, via a first shifting element (A), with the internal gear (HO_VS) of the front-mounted gearset (VS);

the sun gear (SO_NS3) of the coupled rear-mounted gearset (NS23) is connected with the sun gear (SO_NS1) of the first rear-mounted gearset (NS1);

the web (ST_NS23) of the coupled rear-mounted gearset (NS23) is connected with the internal gear (HO_NS1) of the first rear-mounted gearset (NS1);

a connecting shifting element (VE) is provided, for connecting the output shaft (AB) with the web (ST_NS23) of the coupled rear-mounted gearset (NS23), which, when spatially viewed, penetrates axially between the internal gears (HO_NS2, HO_NS3) of the coupled rear-mounted gearset (NS23) and radially entirely overlaps, when viewed in an axial direction, the second internal gear (HO_NS3) of the coupled rear-mounted gearset (NS23); and the input shaft (AN) and the output shaft (AB) are disposed coaxially with respect to one another.

7. The multi-stage automatic transmission according to claim 6, wherein the connecting shifting element (VE) is attached upon the side of the coupled rear-mounted gearset (NS23) opposite the first rear-mounted gearset (NS1) to the web (ST_NS23) of the coupled rear-mounted gearset (NS23).

8. The multi-stage automatic transmission according to claim 3, wherein the planetary gears (P_NS23) of the coupled rear-mounted gearset (NS23) are designed as stepped planetary gears, the first internal gear (HO_NS2) of the coupled rear-mounted gearset (NS23) meshes with a first step of the stepped planetary gears, the second internal gear (HO_NS3) of the coupled rear-mounted gearset (NS23) meshes with a second step of the stepped planetary gears and the sun gear (SO_NS23) of the coupled rear-mounted gearset (NS23) meshes with the one of a first and a second step of the stepped planetary gears.

9. The multi-stage automatic transmission according to claim 1, wherein the internal gears (HO_NS2, HO_NS3) of the second and the third rear-mounted gearsets (NS2, NS3) and of the coupled rear-mounted gearset (NS23) have a different number of teeth.

10. The multi-stage automatic transmission according to claim 1, wherein first, second, third, fourth, fifth, sixth, seventh and eighth forward gears can be shifted without range shifting, with the third and the sixth shifting elements (C, F) engaged for the first forward gear, the second and the sixth shifting elements (B, F) engaged for the second forward gear, the fifth and the sixth shifting elements (E, F) engaged for the third forward gear, the second and the fifth shifting elements (B, E) engaged for the fourth forward gear, the third and the fifth shifting elements (C, E) engaged for the fifth forward gear, the first and the fifth shifting elements (A, E) engaged for the sixth forward gear, the first and the third shifting elements (A, C) engaged for the seventh forward gear and the first and second shifting elements (A, B) engaged for the eighth forward gear.

11. The multi-stage automatic transmission according to claim 1, wherein the third and the fourth shifting elements (C, D) are engaged for a reverse gear.

12. The multi-stage automatic transmission according to claim 1, wherein the third shifting element (C) is provided as a starting element for the multi-stage automatic transmission.

13. The multi-stage automatic transmission according to claim 1, wherein the sixth shifting element (F) is provided as a starting element for starting up in a forward gear and one of the third and the fourth shifting elements (C, D) is provided as a starting element for starting up in a reverse gear.

14. The multi-stage automatic transmission according to claim 1, wherein the front-mounted gearset (VS) is located on a side of the transmission housing (GE) facing a prime mover of the multi-stage automatic transmission which is operatively connected with the input shaft (AN).

15. The multi-stage automatic transmission according to claim 1, wherein one of the third rear-mounted gearset (NS3) and the coupled rear-mounted gearset (NS23) is situated on a side of the transmission housing (GE) remote from the prime mover of the multi-stage automatic transmission.

16. The multi-stage automatic transmission according to claim 1, wherein the first, the second the third rear-mounted gearsets (NS1, NS2, NS3) and the first and a coupled rear mounted gear set (NS1, NS23) of the main gearset are axially disposed side-by-side in a row.

17. The multi-stage automatic transmission according to claim 1, wherein the second shifting element (B) is situated adjacent to the front-mounted gearset (VS).

18. The multi-stage automatic transmission according to claim 1, wherein the second shifting element (B) is situated axially between the front-mounted gearset (VS) and the first rear-mounted gearset (NS1).

19. The multi-stage automatic transmission according to claim 1, wherein the fifth shifting element (E) is situated closer to the first rear-mounted gearset (NS1) than the third shifting element (C), and discs of the fifth shifting element (E) are situated closer to the first rear-mounted gearset (NS1) than discs of the third shifting element (C).

20. The multi-stage automatic transmission according to claim 1, wherein an input element of the third and the fifth shifting elements (C, E) is designed as a disc carrier having a first radial extension section is situated spatially upon a side of the front-mounted gearset (VS) facing the main gearset and is connected with the input shaft (AN), a second axial extension section joins the first radial extension section and penetrates the web (ST_VS) of the front-mounted gearset (VS) in an axial direction, a third radial extension section joins the second radial extension section and is situated upon the side of the front-mounted gearset (VS) opposite the main gearset and extends outwardly in a radial direction, the same as a fourth axial extension section joins the third axial extension section and extends in an axial direction radially above the front-mounted gearset in a direction of the main gearset to the discs of the third and the fifth shifting elements (C, E) and also axially overlaps entirely the front-mounted gearset (VS).

21. The multi-stage automatic transmission according to claim 1, wherein the first shifting element (A) is situated adjacent one of the third rear-mounted gearset (NS3) and the coupled rear-mounted gearset (NS23).

22. The multi-stage automatic transmission according to claim 1, wherein the first shifting element (A) is situated upon one of a side of the third rear-mounted gearset (NS3) remote form the second rear-mounted gearset (NS2) and a side of the coupled rear-mounted gearset (NS23) remote from the first rear-mounted gearset (NS1).

23. The multi-stage automatic transmission according to claim 1, wherein the connecting shifting element (VE) which connects the output element of the main gearset with the output shaft (AB), viewed in an axial direction, completely radially overlaps the first shifting element (A).

* * * * *